Figure 1:
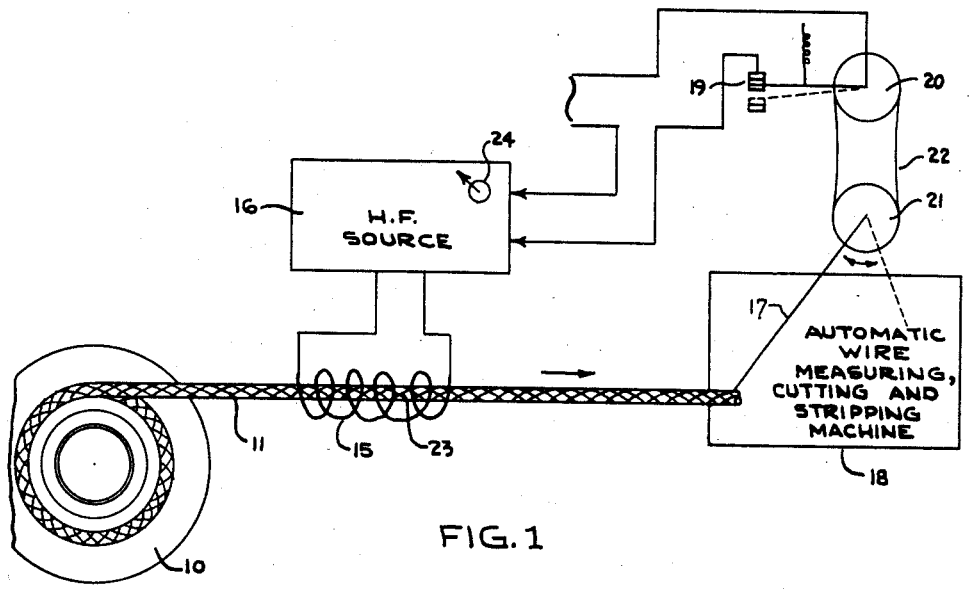

April 28, 1953  W. T. MITCHELL  2,636,408
METHOD OF STRIPPING INSULATED WIRE
Filed March 28, 1949

INVENTOR
WAYNE T. MITCHELL
BY Robert L. Kahn
ATTORNEY

Patented Apr. 28, 1953

2,636,408

UNITED STATES PATENT OFFICE 2,636,408

METHOD OF STRIPPING INSULATED WIRE

Wayne T. Mitchell, Prospect Heights, Ill., assignor to Essex Wire Corporation, Chicago, Ill., a corporation of Michigan Application March 28, 1949, Serial No. 83,797

2 Claims. (Cl. 81—9.51)

This invention relates to a means for and method of stripping insulating wire used in electrical work and is particularly useful in connection with wire used as leads for transformers or other electrical devices.

It is common practice to cut insulated wire to predetermined lengths and strip the ends of such wires free of insulation so that the leads may be soldered to the particular device or apparatus with which they are to be used. As a rule such insulated wire may consist of either solid or stranded wire, frequently tinned and covered with one or more layers of insulation. The insulation for lead wire as a rule is quite thick and is stripped by machines available in the trade. Such stripping machines exert powerful force upon the insulation which is being stripped and in those instances where the insulation adheres tightly to the wire, undesirable stripping action occurs.

Thus in those instances where the wire is one solid strand, the tightly adhering coat of insulation may result in some pieces of insulation remaining and thus prevent a clean break. More frequently, the wire is stranded with the strands twisted along the length of the wire. With such wire, the insulation frequently sticks tightly to the wire so that as the insulation is stripped off, the twisted strands of wire are straightened. When stranded wire is straightened, the individual strands have a tendency to flare making a ragged appearance and making it inconvenient and sometimes difficult to handle. Furthermore, individual strands are frequently torn off.

This invention provides a means for and method of stripping wire whereby insulation may be removed from a length of wire without damage to the wire proper. The invention may be used with solid or stranded wire, whether the wire is tinned or not and may be used with any kind of insulation. The invention has been found to be particularly useful with lead wire of the stranded type where an inner coating of synthetic insulation has been provided. Synthetic materials adhere tightly to wire and are difficult to remove. By virtue of the invention, it has been possible to obtain clean stripped ends without damage to the remaining insulation or to the wire.

The invention in general provides for heating of the wire and insulation at the point where stripping is to be effected. In some instances, the wire may be processed after the wire and insulation have become cold but in general it will be found desirable to cut and strip a wire within a short time after the heating and while the effects of the heating are still present.

While various means for generating heat may be used, it has been found that high frequency heating is particularly effective. With this type of heating it has been found possible to operate upon wire prior to cutting or stripping without interfering with the normal handling of the wire in a stripper. The heating means may be added as an accessory and in no way interferes with the normal operation of a stripper.

As is well known, strippers may be of the manual type wherein a length of insulated wire may have an end inserted into a stripper for stripping. Automatic strippers which measure off a length of wire and cut the same and then strip the two opposed ends are also in common use. The invention may be applied to either type of stripper.

Thus, with a manual or simple stripper where cutting is not involved, the end of the wire to be stripped may be disposed in proper relation to the heating means for a short period of time and then may be inserted into the stripper. With an automatic wire measuring, cutting and stripping machine, the heating means may be disposed to operate upon the wire ahead of cutting and stripping. Assuming that equal lengths of wire are measured off, cut and stripped, it is possible to heat a portion of the wire ahead of where it will be cut and stripped. The heating may be effected one or more wire lengths ahead of the cutting and stripping.

With a combined wire cutting and stripping machine, it is possible to use a high frequency heating system and energize the same either intermittently or continuously. Thus, if the heating system is energized continuously, the amount of heat generated in a wire as it is moving through, will be negligible and will have substantially no effect. It is only when this wire has stopped moving during the cutting and stripping operation that the heating means is effective. It is also possible to intermittently energize the high frequency system so that the heating system is operative only when the wire is stationary during the cutting and stripping.

Figure 2:
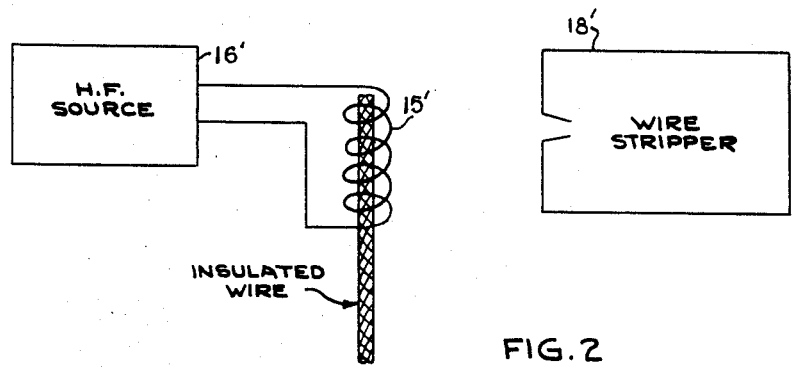
Figure 3:
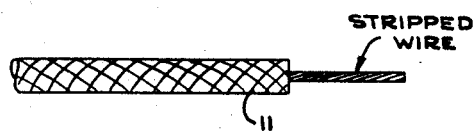

In order that the invention may be understood, it will now be explained in connection with the drawing wherein Figure 1 shows a diagrammatic representation of a system embodying the present invention using an automatic cutting and stripping machine. Figure 2 is a diagrammatic representation of a simple system using a stripper only. Figure 3 shows an insulated wire with an end stripped.

Referring to Figure 1 reel 10 has a quantity of insulated wire 11 from which predetermined lengths of leads are to be made. Wire 11 may pass through guide rolls and is threaded through coil 15 fed by high frequency energy source 16. The high frequency energy may be in any suitable form and as an example may be at 450 kilocycles. The frequency used is preferably low enough to provide negligible losses in the insulation material proper. However, any frequency may be used and the source of such energy may be any one of a number of different types of apparatus. Inasmuch as the invention does not relate to the details of the high frequency generating system, no detailed description is necessary.

Wire 11 continues through coil 15 and passes through suitable guides to arm 17 forming part of automatic cutting and stripping machine 18. Arm 17 normally oscillates over a predetermined course to measure off a predetermined length of wire. Cutting and stripping machines are well known in the industry and require no detailed description. In general, such machines measure and cut wire to predetermined length to separate the lead from the main body of the wire and strip insulation from the opposed ends of the wire.

When the machine operates, arm 17 oscillates between the full and dotted line positions. Thus when arm 17 moves from left to right, it feeds wire 11, this serving to measure off a length of wire. It is understood that the amount of swing of arm 17 may be adjusted to measure off a desired length of wire. When arm 17 reaches its dotted line position, the wire length has been measured. While arm 17 is returning to its full line position, machine 18 severs the wire length and strips the opposing wire ends of insulation.

In order to energize high frequency source 16 only while the wire is stationary, suitable means may be provided for accomplishing this. Thus switch 19 for controlling high frequency source 16 may be closed when arm 17 is moving left and opened when an arm 17 is moving right. A simple means for accomplishing this involves pulleys 20 and 21 with flexible belt 22. When arm 17 moves left, the pulleys will be turned clockwise and close switch 19. Upon right hand movement of arm 17, the switch will be opened. It is understood that switch 19 may control the plate supply of a vacuum tube oscillator so that the tube filaments need not be periodically energized.

In the event that machine 18 would keep the wire moving at all times, then it would be desirable to have a loop of wire between coil 15 and machine 18. This is similar to moving picture projectors where a film loop between continuously and intermittently moving frame portions is provided.

It is understood that wire portion 23 within coil 15 is at least one or more integral cable lengths away from the portion of the wire being severed and stripped. The length of coil 15 is designed so that the length of wire treated by high frequency will be equal to the sum of the lengths of the two adjacent stripped ends.

Suitable control 24 for governing the amount of high frequency energy fed to coil 15 is preferably provided. This control is adjusted so that the proper amount of energy is fed into the wire. The amount of energy fed to the wire will be determined by the amount of time during which the wire is resting, the size of the wire, the nature of the insulation and the time elapsing between feeding and stripping. As a rule, the control may be adjusted by simple experiment.

The size of coil 15, the number of turns and the like will all be determined by the frequency of generator 16 and other design factors well known in this art.

Referring now to Figure 2 there is shown a high frequency coil 15' and a simple stripper 18'. In this system, the machine does not measure or cut the wire but merely strips the same. In this modification, the end of a wire may be inserted into coil 15' and maintained there for a suitable time. Thereafter, the wire may be inserted into the stripper for cleaning the end of the wire.

The invention is particularly useful with wire having insulation such as nylon or Vinylite applied thereto as a liquid and permitted to set on the wire. This may also be true of other synthetic materials, including rubber. As a rule, such material adheres intimately to the wire and has frequently been a source of trouble in connection with stripping.

Where wire is stranded and tinned it has been found advantageous to feed a sufficient amount of energy to the wire to cause a local melting of the tin coating on the individual strands. Thus the individual strands are soldered together and after stripping provide an excellent end for handling. Such a wire is shown in Figure 3. Where the wire has not been tinned, no such result as regards soldering will be obtained. However, the heat at the surface of the wire, particularly in the case of Vinylite, is sufficiently great to melt a thin layer of Vinylite and permit the insulation to slide off the wire with little difficulty. Thus, in all cases, twisted strands are not straightened out but maintain their twist thus eliminating any tendency for individual wire strands to flare. At the same time, the insulation comes off clean so that desirable stripping results with all kinds of wire.

What is claimed is:

1. A method for facilitating stripping an end of insulated, pretinned, stranded wire, said method comprising impressing a high frequency electromagnetic field on the portion of the insulated wire to be stripped to heat the surface of the wire momentarily enough to cause local melting of the metal on the outside of the wire strands so that upon cooling the normally separate strands are soldered together and stripping the undesired insulation from the wire lengthwise thereof.

2. A method for facilitating the stripping of thermoplastic insulation from pretinned, stranded wire, said method comprising impressing a high frequency electromagnetic field on the insulated part of the wire to be stripped to momentarily generate enough heat to cause local melting of the metal on the outside of the wire strands and loosening of the bond of the thermoplastic insulation upon the wire so that upon cooling, the normally separate strands are soldered together, and stripping the insulation from the wire.

WAYNE T. MITCHELL.

References Cited in the file of this patent

UNITED STATES PATENTS

| Number | Name | Date |
| --- | --- | --- |
| 1,734,745 | Ray | Nov. 5, 1929 |
| 1,787,658 | Andren et al. | Jan. 6, 1931 |
| 1,882,947 | Rotherham | Oct. 18, 1932 |
| 2,066,525 | Gilbert | Jan. 5, 1937 |
| 2,291,862 | Bailey | Aug. 4, 1942 |
| 2,421,319 | Ehret | May 27, 1947 |
| 2,425,123 | Quayle | Aug. 5, 1947 |